United States Patent [19]
Kolouch et al.

[11] Patent Number: 6,042,702
[45] Date of Patent: Mar. 28, 2000

[54] ELECTROCHEMICAL CELL HAVING A CURRENT DISTRIBUTOR COMPRISING A CONDUCTIVE POLYMER COMPOSITE MATERIAL

[75] Inventors: Robert Joseph Kolouch, Vienna, W. Va.; David Lee Reichert, Newark, Del.; Robert Lloyd Freed, West Chester, Pa.; Andrew Kelsey Birchenall, Middletown, Del.; Clarence Garlan Law, Jr., West Trenton, N.J.; James Arthur Trainham, III, Newark, Del.; John Scott Newman, Kensington, Calif.; Douglas John Eames, Chamblee, Ga.

[73] Assignee: E.I. du Pont de Nemours and Company, Wilmington, Del.

[21] Appl. No.: 08/812,494

[22] Filed: Mar. 7, 1997

Related U.S. Application Data

[63] Continuation of application No. 08/812,494, Mar. 7, 1997, abandoned, which is a continuation-in-part of application No. 08/431,608, May 1, 1995, Pat. No. 5,611,897, and application No. 08/246,909, May 20, 1994, Pat. No. 5,580,437, which is a continuation-in-part of application No. 08/156,196, Nov. 22, 1993, abandoned.

[51] Int. Cl.[7] .................................................. C25B 9/00
[52] U.S. Cl. .............................................................. 204/252
[58] Field of Search .................................... 204/252, 279, 204/291, 282, 283, 290 R

[56] References Cited

U.S. PATENT DOCUMENTS

| | | | |
|---|---|---|---|
| 3,453,187 | 7/1969 | Slatin | 204/69 |
| 3,729,395 | 4/1973 | Caron et al. | 204/59 R |

(List continued on next page.)

FOREIGN PATENT DOCUMENTS

| | | |
|---|---|---|
| 1 179 631 | 12/1984 | Canada . |
| 1 195 949 | 10/1985 | Canada . |
| 0007078 | 1/1980 | European Pat. Off. ............... 204/282 |
| 0 319 489 | 6/1989 | European Pat. Off. . |
| 0 601 604 | 6/1994 | European Pat. Off. . |
| 0 629 015 | 12/1994 | European Pat. Off. . |
| 2 312 297 | 3/1973 | Germany . |
| 56-36873 | 8/1981 | Japan . |
| 1-168748 | 7/1989 | Japan . |
| 363424 | 12/1931 | United Kingdom . |
| 861978 | 3/1961 | United Kingdom . |
| WO 95/14797 | 6/1995 | WIPO . |

OTHER PUBLICATIONS

Appleby, A.J. et al., Solid Polymer Acid Electrolytes, *Fuel Cell Handbook*, 10, 286–312, 1989.
Jewulski, J. R., et al., Solid State Proton Conductors, *Final Report, Work Performed Under Contract No.: DE–AC21–88MC24218 for U.S. Department of Energy*, Jan. 1999, 1990 No month available.
Minz, F.R. (Dr.), HCl–Electrolysis—Technology for Recycling Chlorine, Bayer AG, 1993 No month available.
Takenaka, H., et al., Solid Polymer Electrolyte Water Electrolysis, *Int. J. Hydrogen Energy*, 7(5), 397–403, 1982 No month available.
Wilson, M.S. et al., High Performance Catalyzed Membranes of Ultra–low Pt Loadings for Polymer Electrolyte Fuel Cells, *J. Electrochem. Soc.*, 2, L–28—L–30, Feb. 1992.

*Primary Examiner*—Kathryn Gorgos

[57] ABSTRACT

The invention relates to an electrochemical cell which has an electrode, a membrane disposed in contact with one side of the electrode and a current bus disposed on the other side of the electrode. A current distributor which is disposed between the electrode and the current bus distributes current to the electrode by electronic conduction. The current distributor is made of a non-porous layer of a conductive polymer composite material. The current distributor thus provides a barrier between the current bus and the reactant and the product of the cell. This is especially important in aggressive environments, such as hydrogen chloride. Thus, the cell of the present invention is particularly useful in converting anhydrous hydrogen halide directly to essentially dry halogen gas, such as anhydrous hydrogen chloride to chlorine gas, or in converting aqueous hydrogen chloride to wet chlorine gas.

50 Claims, 2 Drawing Sheets

U.S. PATENT DOCUMENTS

| | | | |
|---|---|---|---|
| 4,139,447 | 2/1979 | Faron et al. | 204/239 |
| 4,169,025 | 9/1979 | Needes | 204/98 |
| 4,191,618 | 3/1980 | Coker et al. | 204/98 |
| 4,210,501 | 7/1980 | Dempsey et al. | 204/129 |
| 4,214,969 | 7/1980 | Lawrence | 204/255 |
| 4,224,121 | 9/1980 | Dempsey et al. | 204/98 |
| 4,294,671 | 10/1981 | Balko | 204/128 |
| 4,311,568 | 1/1982 | Balko | 204/128 |
| 4,339,314 | 7/1982 | Hoekje | 204/98 |
| 4,595,579 | 6/1986 | Prudhon et al. | 423/487 |
| 4,655,887 | 4/1987 | Oda et al. | 204/98 |
| 4,666,574 | 5/1987 | Oda et al. | 204/98 |
| 4,902,444 | 2/1990 | Kolouch | 252/511 |
| 4,909,912 | 3/1990 | Oda et al. | 204/98 |
| 4,959,132 | 9/1990 | Fedkiw, Jr. | 204/101 |
| 5,000,875 | 3/1991 | Kolouch | 252/511 |
| 5,223,102 | 6/1993 | Fedkiw, Jr. et al. | 204/78 |

ELECTROCHEMICAL CELL HAVING A CURRENT DISTRIBUTOR COMPRISING A CONDUCTIVE POLYMER COMPOSITE MATERIAL

This application is a continuation of U.S. Application Ser. No. 08/812,494, filed Mar. 7, 1997, now abandoned, which is a continuation-in-part of U.S. Application Ser. No. 08/431,608, filed May 1, 1995, now U.S. Pat. No. 5,611,897, issued Mar. 18, 1997, which was surrendered in favor of this reissue application U.S. Application Ser. No. 08/812,494 filed Mar. 7, 1997, and U.S. Application Ser. No. 08/246,909, filed May 20, 1994, now U.S. Pat. No. 5,580,437, issued on Dec. 3, 1996, which was surrendered in favor of reissue application U.S. Application Ser. No. 09/093,535 filed Jun. 8, 1998, which is. a continuation-in-part of U.S. Application Ser. No. 08/156,196, now abandoned.

BACKGROUND OF THE INVENTION

1. Field of the Invention

The present invention relates to an electro-chemical cell having a current distributor made of a conductive polymer composite material. In particular, the current distributor is useful in a cell for converting anhydrous hydrogen halide, in particular, hydrogen chloride, hydrogen fluoride, hydrogen bromide and hydrogen iodide, to a dry halogen gas, such as chlorine, fluorine, bromine, or iodine. In addition, the current distributor may be used in an electro-chemical cell which converts an aqueous reactant to an aqueous product.

2. Description of the Related Art

Hydrogen chloride (HCl) or hydrochloric acid is a reaction by-product of many manufacturing processes which use chlorine. For example, chlorine is used to manufacture polyvinyl chloride, isocyanates, and chlorinated hydrocarbons/fluorinated hydrocarbons, with hydrogen chloride as a by-product of these processes. Because supply so exceeds demand, hydrogen chloride or the acid produced often cannot be sold or used, even after careful purification. Shipment over long distances is not economically feasible. Discharge of the acid or chloride ions into waste water streams is environmentally unsound. Recovery and feedback of the chlorine to the manufacturing process is the most desirable route for handling the HCl by-product.

A number of commercial processes have been developed to convert HCl into usable chlorine gas. See, e.g., F. R. Minz, "HCl-Electrolysis—Technology for Recycling Chlorine", Bayer AG, Conference on Electrochemical Processing, Innovation & Progress, Glasgow, Scotland, UK, Apr. 21–23, 1993.

Currently, thermal catalytic oxidation processes exist for converting anhydrous HCl and aqueous HCl into chlorine. Commercial processes, known as the "Shell-Chlor", the "Kel-Chlor" and the "MT-Chlor" processes, are based on the Deacon reaction. The original Deacon reaction as developed in the 1870's made use of a fluidized bed containing a copper chloride salt which acted as the catalyst. The Deacon reaction is generally expressed as follows:

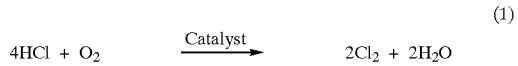

(1)

where the following catalysts may be used, depending on the reaction or process in which equation (1) is used.

| Catalyst | Reaction or Process |
| --- | --- |
| Cu | Deacon |
| Cu, Rare Earth, Alkali | Shell-Chlor |
| $NO_2$, $NOHSO_4$ | Kel-Chlor |
| $Cr_mO_n$ | MT-Chlor |

The commercial improvements to the Deacon reaction have used other catalysts in addition to or in place of the copper used in the Deacon reaction, such as rare earth compounds, various forms of nitrogen oxide, and chromium oxide, in order to improve the rate of conversion, to reduce the energy input and to reduce the corrosive effects on the processing equipment produced by harsh chemical reaction conditions. However, in general, these thermal catalytic oxidation processes are complicated because they require separating the different reaction components in order to achieve product purity. They also involve the production of highly corrosive intermediates, which necessitates expensive construction materials for the reaction systems. Moreover, these thermal catalytic oxidation processes are operated at elevated temperatures of 250° C. and above.

Electrochemical processes exist for converting aqueous HCl to chlorine gas by passage of direct electrical current through the solution. The current electrochemical commercial process is known as the Uhde process. In the Uhde process, aqueous HCl solution of approximately 22% is fed at 65° to 80° C. to both compartments of an electrochemical cell, where exposure to a direct current in the cell results in an electro-chemical reaction and a decrease in HCl concentration to 17% with the production of chlorine gas and hydrogen gas. A polymeric separator divides the two compartments. The process requires recycling of dilute (17%) HCl solution produced during the electrolysis step and regenerating an HCl solution of 22% for feed to the electrochemical cell. The overall reaction of the Uhde process is expressed by the equation:

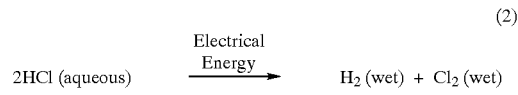

(2)

As is apparent from equation (2), the chlorine gas produced by the Uhde process is wet, usually containing about 1% to 2% water. This wet chlorine gas must then be further processed to produce a dry, usable gas. If the concentration of HCl in the water becomes too low, it is possible for oxygen to be generated from the water present in the Uhde process. This possible side reaction of the Uhde process due to the presence of water, is expressed by the equation:

$$2H_2O \rightarrow O_2 + 4H^+ + 4e^-$$ (3)

Further, the presence of water in the Uhde system limits the current densities at which the cells can perform to less than 500 amps./ft.$^2$, because of this side reaction. The side reaction results in reduced electrical efficiency and corrosion of the cell components.

Another electrochemical process for processing aqueous HCl has been described in U.S. Pat. No. 4,311,568 to Balko. Balko employs an electrolytic cell having a solid polymer electrolyte membrane. Hydrogen chloride, in the form of hydrogen ions and chloride ions in aqueous solution, is introduced into an electrolytic cell. The solid polymer electrolyte membrane is bonded to the anode to permit transport from the anode surface into the membrane. In Balko, controlling and minimizing the oxygen evolution side reaction is an important consideration. Evolution of oxygen decreases cell efficiency and leads to rapid corrosion of components of the cell. The design and configuration of the anode pore size and electrode thickness employed by Balko maximizes transport of the chloride ions. This results in effective chlorine evolution while minimizing the evolution of oxygen, since oxygen evolution tends to increase under conditions of chloride ion depletion near the anode surface. In Balko, although oxygen evolution may be minimized, it is not eliminated. As can be seen from FIGS. 3 to 5 of Balko, as the overall current density is increased, the rate of oxygen evolution increases, as evidenced by the increase in the concentration of oxygen found in the chlorine produced. Balko can run at higher current densities, but is limited by the deleterious effects of oxygen evolution. If the Balko cell were to be run at high current densities, the anode would be destroyed.

In an electrochemical cell which processes aqueous reactants, it is known to use graphite-polyvinylidene fluoride, sold under the trademark KYNAR® by Elf Atochem North America, Inc. Fluoropolymers, for a current collector as disclosed in U.S. Pat. No. 4,214,969 to Lawrance. However, it has been found that graphite can be oxidized, due to the side reaction of oxygen generated from water, as expressed in equation (3) above. Moreover, the bulk resistivity of the current collector as disclosed in Lawrance is less than $4 \times 10^{-3}$ ohm·in ($1 \times 10^{-2}$ ohm·cm) for all conditions and ranges between $1.2–3.6 \times 10^{-3}$ ohm·in. The lowest bulk resistivity exemplified is $1.18 \times 10^{-3}$ ohm·in. ($3.00 \times 10^{-3}$ ohm·cm.). U.S. Pat. No. 5,000,875 to Kolouch discloses tetrafluoroethylene compositions containing conductive carbon black, graphite fiber or thermally conductive fillers. The lowest resistivity disclosed in Kolouch is 0.7 ohm·cm.

Certain hydrogen halides, such as HCl, are particularly corrosive. Thus, there exists a need for developing a material which is suitable for use in an electrochemical cell which is able to withstand attack from such corrosive hydrogen halides and which can consistently conduct current. More specifically, there exists a need for developing a material which has a lower bulk resistivity than the bulk resistivity of known current collector materials of the prior art.

SUMMARY OF THE INVENTION

The present invention solves the problems of the prior art by providing an electrochemical cell for directly producing essentially dry halogen gas from essentially anhydrous hydrogen halide where the cell has a conductive current distributor which acts as a corrosion-resistant barrier to the essentially dry halogen gas and the essentially anhydrous hydrogen halide. This process allows for direct processing of anhydrous hydrogen halide which is a by-product of manufacturing processes, without first dissolving the hydrogen halide in water. This direct production of essentially dry halogen gas, when done, for example, for chlorine gas, is less capital intensive than processes of the prior art, which require separation of water from the chlorine gas. This direct production of essentially dry chlorine gas also requires lower investment costs than the electrochemical conversions of hydrogen chloride of the prior art. This advantage can translate directly into lower power costs per pound of say, chlorine, generated than in the aqueous electrochemical processes of the prior art. The direct production of essentially dry chlorine gas also provides a process which produces drier chlorine gas with fewer processing steps as compared to that produced by electrochemical or catalytic systems of the prior art, thereby simplifying processing conditions and reducing capital costs.

The present invention provides a material which can be used for a current distributor and which is able to withstand attack from corrosive hydrogen halides, such as hydrogen chloride, and which can consistently conduct current, whether used in an electrochemical cell for converting aqueous or anhydrous reactants. Thus, the current distributor of the present invention provides an effective barrier between the current bus, and the electrodes, and in particular between the corrosive hydrogen halide and the halogen gas. This makes the process of the present invention even more practicable and economically attractive.

To achieve the foregoing solutions, and in accordance with the purposes of the invention as embodied and broadly described herein, there is provided an electrochemical cell comprising a first electrode; a membrane disposed in contact with one side of the first electrode a second electrode disposed in contact with the other side of the membrane; and current distributing means disposed on the other side of the electrode for distributing current by electronic conduction, wherein the current distributing means comprises a conductive polymer composite material having a bulk resistivity of less than $1 \times 10^{-3}$ ohm·cm.

Further in accordance with the purposes of the invention, there is provided a cell for directly producing essentially dry halogen gas from essentially anhydrous hydrogen halide. The electrochemical cell comprises means for oxidizing molecules of essentially anhydrous hydrogen halide to produce essentially dry halogen gas and protons; cation-transporting means for transporting the protons therethrough, where one side of the oxidizing means is disposed in contact with one side of the cation-transporting means; means for reducing the transported protons, wherein the reducing means is disposed in contact with the other side of the cation-transporting means; a current bus disposed on the other side of the oxidizing means; and current distributing means disposed between the current bus and the oxidizing means for providing a barrier between the current bus and the essentially anhydrous hydrogen halide and the essentially dry halogen gas, wherein the current distributing means comprises a conductive polymer composite material.

DESCRIPTION OF THE PREFERRED EMBODIMENTS

Reference will now be made in detail to the present preferred embodiments of the invention as illustrated in the accompanying drawings.

In accordance with a first and second embodiment of the present invention, there is provided an electrochemical cell for the direct production of essentially dry halogen gas from anhydrous hydrogen halide. Such a cell is shown generally at 10 in FIG. 1. The cell of the present invention will be described with respect to a preferred embodiment of the present invention, which directly produces essentially dry chlorine gas from essentially anhydrous hydrogen chloride. This cell may alternatively be used to produce other halogen gases, such as bromine, fluorine and iodine from a respective anhydrous hydrogen halide, such as hydrogen bromide, hydrogen fluoride and hydrogen iodide. However, hydrogen fluoride may be particularly corrosive when used with the present invention. The term "direct" means that the electrochemical cell obviates the need to remove water from the halogen gas produced or the need to convert essentially anhydrous hydrogen halide to aqueous hydrogen halide before electrochemical treatment. In the first embodiment, chlorine gas, as well as hydrogen, is produced in this cell. In a second embodiment, water, as well as chlorine gas, is produced by this cell, as will be explained more fully below.

Figure 1:
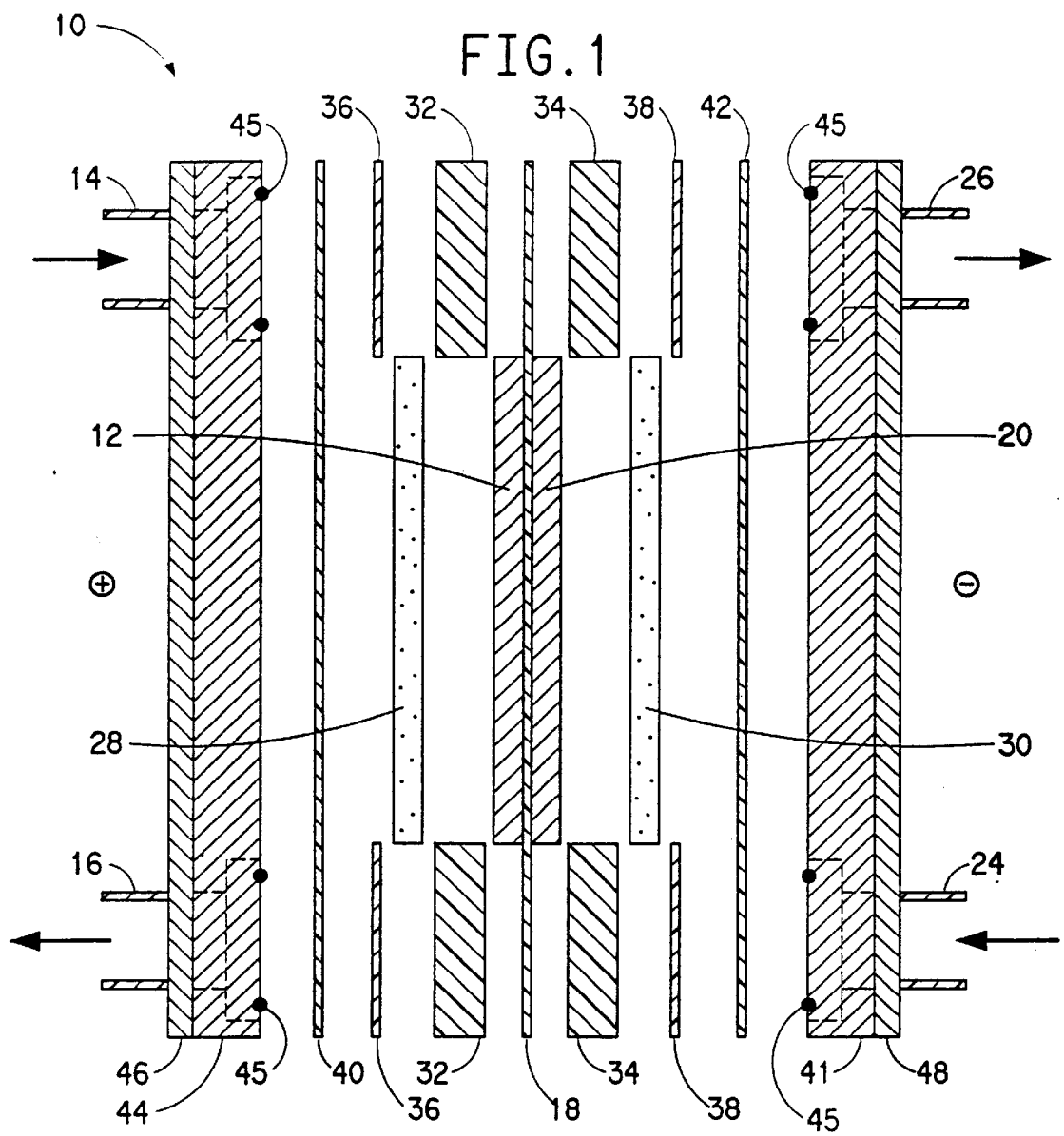
FIG. 1 is an exploded cross-sectional view of an electrochemical cell for producing halogen gas from anhydrous hydrogen halide according to a first and a second embodiment of the present invention.

The electrochemical cell of the first and second embodiments comprises an electrode. Alternatively, the electrochemical cell of the first and second embodiments may be described as comprising means for oxidizing molecules of essentially anhydrous hydrogen halide to produce essentially dry halogen gas and protons. The oxidizing means is an electrode, or more specifically, an anode 12 as shown in FIG. 1. On the anode side, electrochemical cell 10 has an anode-side inlet 14 and an anode-side outlet 16. Since in the preferred embodiment, anhydrous HCl is carried through the inlet, and chlorine gas is carried through the outlet, the inlet and the outlet may be lined with a copolymer of tetrafluoroethylene with (perfluoro) alkyl-vinyl ether, sold under the trademark "TEFLON®", hereinafter) referred to as "PFA" by E. I. du Pont de Nemours and Company of Wilmington, Del. (hereinafter referred to as "DuPont").

The electrochemical cell of the first and second embodiments also comprises a membrane. Alternatively, the electrochemical cell of the first and second embodiments may be described as comprising cation-transporting means for transporting the protons therethrough, where one side of the oxidizing means is disposed in contact with one side of the cation-transporting means. Preferably, the cation-transporting means is a cation-transporting membrane 18 as shown in FIG. 1. More specifically, membrane 18 may be a proton-conducting membrane. Membrane 18 may be a commercial cationic membrane made of a fluoro- or perfluoropolymer, preferably a copolymer of two or more fluoro or perfluoromonomers, at least one of which has pendant sulfonic acid groups. The presence of carboxylic groups is not desirable, because those groups tend to decrease the conductivity of the membrane when they are protonated. Various suitable resin materials are available commercially or can be made according to patent literature. They include fluorinated polymers with side chains of the type —CF$_2$CFRSO$_3$H and —OCF$_2$CF$_2$CF$_2$SO$_3$H, where R is an F, Cl, CF$_2$Cl, or a C$_1$ to C$_{10}$ perfluoroalkyl radical. The membrane resin may be, for example, a copolymer of tetrafluoroethylene with CF$_2$=CFOCF$_2$CF(CF$_3$)OCF$_2$CF$_2$SO$_3$H. Sometimes those resins may be in the form that has pendant —SO2F groups, rather than —SO$_3$H groups. The sulfonyl fluoride groups can be hydrolyzed with potassium hydroxide to —SO$_3$K groups, which then are exchanged with an acid to =13 SO$_3$H groups. Suitable perfluorinated cationic membranes, which are made of hydrated, copolymers of polytetrafluoroethylene and polysulfonyl fluoride vinyl ether-containing pendant sulfonic acid groups, are offered by DuPont under the trademark "NAFION" (hereinafter referred to as NAFION®). In particular, NAFION® membranes containing pendant sulfonic acid groups include NAFION® 117, NAFION® 324 and NAFION® 417. The first type of NAFION® is unsupported and has an equivalent weight of 1100 g., equivalent weight being defined as the amount of resin required to neutralize one liter of a 1M sodium hydroxide solution. The other two types of NAFION® are both supported on a fluorocarbon fabric, the equivalent weight of NAFION®417 also being 1100 g. NAFION® 324 has a two-layer structure, a 125 μm-thick membrane having an equivalent weight of 1100 g., and a 25 μm-thick membrane having an equivalent weight of 1500 g.

Although the present invention describes the use of a solid polymer electrolyte membrane, it is well within the scope of the invention to use other cation-transporting membranes which are not polymeric. For example, proton-conducting ceramics such as beta-alumina may be used. Beta-alumina is a class of nonstoichiometric crystalline compounds having the general structure Na$_2$O$_x$.Al$_2$O$_3$, in which x ranges from 5 (β-alumina) to 11 (β-alumina). This material and a number of solid electrolytes which are useful for the invention are described in the *Fuel Cell Handbook*, A. J. Appleby and F. R. Foulkes, Van Nostrand Reinhold, N.Y., 1989, pages 308–312. Additional useful solid state proton conductors, especially the cerates of strontium and barium, such as strontium ytterbiate cerate (SrCe$_{0.95}$Yb$_{0.05}$O$_{3-\alpha}$) and barium neodymiate cerate (BaCe$_{0.9}$Nd$_{0.01}$O$_{3-\alpha}$) are described in a final report, DOE/MC/24218–2957, Jewulski, Osif and Remick, prepared for the U.S. Department of Energy, Office of Fossil Energy, Morgantown Energy Technology Center by Institute of Gas Technology, Chicago, Ill., December, 1990.

Figure 1A:
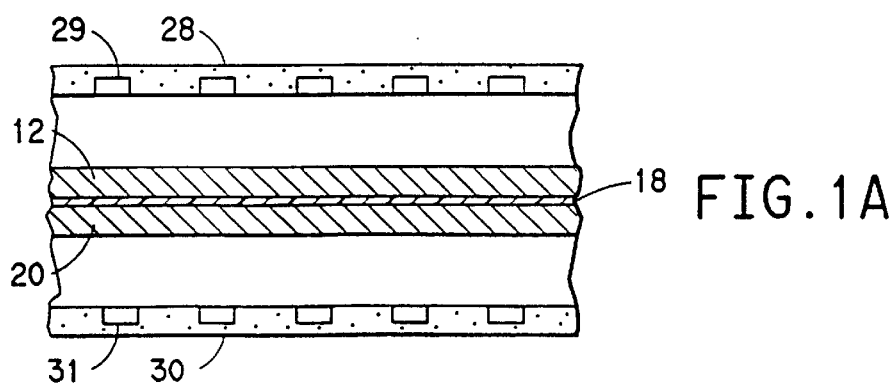
FIG. 1A is a cut-away, top cross-sectional view of the anode and cathode mass flow fields as shown in FIG. 1.

The electrochemical cell of the first and second embodiments also comprises an electrode, or a cathode 20. Alternatively, the electrochemical cell of the first and second embodiments may be described as comprising means for reducing the transported protons, where the reducing means is disposed in contact with the other side of the cation-transporting means. The reducing means comprises a cathode 20, where cathode 20 is disposed in contact with the other side (as opposed to the side which is in contact with the anode) of membrane 18 as illustrated in FIGS. 1 and 1A. Electrochemical cell 10 cathode-side inlet 24 and a cathode-side outlet 26 as shown in FIG. 1. Since in the preferred embodiment, anhydrous HCl is processed, and since some chlorides pass through the membrane and consequently, HCl is present on the cathode-side of the cell, the cathode inlet and the outlet may be lined with PFA.

As known to one skilled in the art, if electrodes are placed on opposite faces of membrane, cationic charges (protons in the HCl reaction being described) are transported through the membrane from anode to cathode, while each electrode carries out a half-cell reaction. In the first and second embodiments, molecules of anhydrous hydrogen chloride are transported to the surface of the anode through anode-side inlet 14. The molecules of the anhydrous hydrogen chloride are oxidized to produce essentially dry chlorine gas and protons. The essentially dry chlorine gas exits through anode-side outlet 16 as shown in FIG. 1. The protons, H$^+$, are transported through the membrane and reduced at the cathode. This is explained in more detail below.

The anode and the cathode may comprise porous, gas-diffusion electrodes. Such electrodes provide the advantage of high specific surface area, as known to one skilled in the art. The anode and the cathode comprise an electrochemically active material disposed adjacent, meaning at or under, the surface of the cation-transporting membrane. A thin film of the electrochemically active material may be applied directly to the membrane. Alternatively, the electrochemically active material may be hot-pressed to the membrane, as shown in A. J. Appleby and E. B. Yeager, Energy, Vol. 11, 137 (1986). Alternatively, the electrochemically active material may be deposited into the membrane, as shown in U.S. Pat. No. 4,959,132 to Fedkiw. The electrochemically active material may comprise any type of catalytic or metallic material or metallic oxide, as long as the material can support charge transfer. Preferably, the electrochemically active material may comprise a catalyst material such as platinum, ruthenium, osmium, rhenium, rhodium, iridium, palladium, gold, titanium or zirconium and the oxides, alloys or mixtures thereof. However, in general, the oxides of these materials are not used for the cathode. Other catalyst materials suitable for use with the present invention may include, but are not limited to, transition metal macro cycles in monomeric and polymeric forms and transition metal oxides, including perovskites and pyrochores.

In a hot-pressed electrode, the electrochemically active material may comprise a catalyst material on a support material. The support material may comprise particles of carbon and particles of polytetrafluoroethylene or PTFE, which tetrafluoroethylene is a fluoro polymer resin sold under the trademark TEFLON® (hereinafter referred to as PTFE), commercially available from DuPont. The electrochemically active material may be bonded by virtue of the PTFE to a support structure of carbon paper or graphite cloth and hot-pressed to the cation-transporting membrane. The hydrophobic nature of PTFE does not allow a film of water to form at the anode. A water barrier in the electrode would hamper the diffusion of HCl to the reaction sites. The electrodes are preferably hot-pressed into the membrane in order to have good contact between the catalyst material and the membrane.

The loadings of electrochemically active material may vary based on the method of application to the membrane. Hot-pressed, gas-diffusion electrodes typically have loadings of 0.10 to 0.50 mg/cm$^2$. Lower loadings are possible with other available methods of deposition, such as distributing them as thin films from inks onto the membranes, as described in Wilson and Gottesfeld, "High Performance Catalyzed Membranes of Ultra-low Pt Loadings for Polymer Electrolyte Fuel Cells", Los Alamos National Laboratory, J. Electrochem. Soc., Vol. 139, No. 2 L28–30, 1992, where the inks contain solubilized NAFION® to enhance the catalyst-ionomer surface contact and to act as a binder to the NAFION® perfluorinated membrane sheet. With such a system, loadings as low as 0.017 mg active material per cm$^2$ have been achieved.

The electrochemical cell of the first and second embodiments further comprises an anode flow field 28 disposed in contact with the anode and a cathode flow field 30 disposed in contact with the cathode. The flow fields are electrically conductive, and act as both mass and current flow fields. The mass flow fields may include a plurality of anode flow channels 29 and a plurality of cathode flow channels 31 as shown in FIG. 1A. The purpose of the anode flow field and channels 29 formed therein is to get reactants, such as anhydrous HCl in the first and second embodiments, to the anode and products, such as essentially dry chlorine gas from the anode. The purpose of the cathode flow field and channels 31 formed therein is to get catholyte, such as liquid water in the first embodiment, or oxygen gas in the second embodiment, to the cathode and products, such as hydrogen gas in the first embodiment, or an oxygen-containing gas, which may contain water vapor ($H_2O(g)$) as a result of humidification, from the cathode in the second embodiment. Water vapor may be needed to keep the membrane hydrated. However, water vapor may not be necessary in this embodiment because of the water produced by the electrochemical reaction of the oxygen ($O_2$) added as discussed below. It is within the scope of the present invention that the flow fields and the flow channels may have a variety of configurations. Also, the flow fields may be made in any manner known to one skilled in the art. Preferably, the anode and the cathode flow fields comprise porous graphite paper. The flow fields may also be made of a porous carbon in the form of a foam, cloth or matte.

The electrochemical cell of the first and second embodiments may also comprise an anode mass flow manifold 32 and a cathode mass flow field manifold 34 as shown in FIG. 1. The purpose of such manifolds is to bring anolyte to and products from the anode, and catholyte to and products from the cathode. In addition, the manifolds form a frame around the anode mass flow field and the anode, and the cathode mass flow field and the cathode, respectively. These manifolds are preferably made of a corrosion resistant material, such as PFA. A gasket 36, 38, also contributes to forming a frame around the respective anode and cathode mass flow fields. These gaskets are preferably also made of a corrosion resistant material, such as PTFE.

The electrochemical cell of the first and second embodiments also comprises an anode current bus 46 and a cathode current bus 48 as shown in FIG. 1. The current buses conduct current to and from a voltage source (not shown). Specifically, anode current bus 46 is connected to the positive terminal of a voltage source, and cathode current bus 48 is connected to the negative terminal of the voltage source, so that when voltage is supplied to the cell, current flows through all of the cell components to the right of current bus 46 as shown in FIG. 1, including current bus 48, from which it returns to the voltage source. The current buses are made of a conductor material, such as copper.

The electrochemical cell of the first and second embodiments further comprises anode current distributing means disposed on one side of the electrode, or the oxidizing means, for distributing current to the electrode, or the oxidizing means, by electronic conduction and for allowing current to flow away from the electrode, or the oxidizing means. More specifically, the anode current distributor collects current from the anode bus and distributes it to the anode by electronic conduction. Preferably, the anode current distributing means comprises an anode current distributor 40 as shown in FIG. 1. Alternatively, the current distributing means may be described as means disposed between the current bus and the oxidizing means for providing a barrier between the current bus and the electrode or the oxidizing means, and also between the current bus and the hydrogen halide, such as hydrogen chloride and the halogen gas, such as chlorine gas. Thus, the current distributor comprises a non-porous layer.

As noted above, the anode flow field, which is disposed next to the anode current distributor as shown in FIG. 1, brings anolyte, such as anhydrous hydrogen halide in the first and second embodiments, to the anode, and takes products, such as essentially dry chlorine gas in the first and second embodiments, away from the anode. Certain hydrogen halides, such as HCl, are particularly corrosive. Therefore, in accordance with the present invention, the current distributor is made from a material which is corrosion resistant, electrically conductive and which possesses a high degree of impermeability to the reactants and the starting materials, whether gaseous or liquid, of the process conducted in the electrochemical cell. These criteria can be met by certain conductive polymer composite materials. Thus, the anode current distributor of the present invention comprises a conductive polymer composite material. For purposes herein, the term conductive polymer composite material means a composite comprising an organic polymer and an electrically conductive filler material. Preferably, the composite material has a bulk resistivity less than $1 \times 10^{-3}$ ohm·cm.

The organic polymer is selected from the group consisting of fluoropolymers, fluoroelastomers, elastomers and vinyl ester polymers. Included in the group of fluoropolymers are PTFE; tetrafluoroethylene-hexafluoropropylene copolymer, also referred to as fluorinated ethylene-propylene copolymer or, FEP; sold under the trademark TEFLON® by DUPONT tetrafluoroethylene copolymer or, ETFE, sold under the trademark "TEFZEL®" by DuPont; PFA poly (chlorotrifluorotetrafluoroethylene), PCTFE; vinylidene fluoride-tetrafluoroethylene copolymer, $VF_2$-TFE; and KYNARD.

Included in the group of fluoroelastomers are vinylidene fluoride-hexafluoropropylene copolymer, sold under the trademark VITON® A by DuPont. Dow; vinylidene fluoride-hexafluoropropylene-tetrafluoroethylene terpolymer, sold under the trademark VITON® B by DuPont Dow; and tetrafluoroethylene-perfluoro(methy vinyl ether)+ cure site monomer terpolymer, a perfluoroelastomer sold in parts under the trademark KALREZ® (hereinafter referred to as "KALREZO") by DuPont.

Included in the group of elastomers is, for example, ethylene-propylene-diene terpolymer, EPDM. Included in the group of vinyl esters are the thermosetting resins known generically as epoxy vinyl ester resins in admixture with styrene. These are sold by Dow Chemical Company of Midland, Mich. under the trademark DERAKANE®.

The electrically conductive filler material is selected from the group consisting of the nitrides, borides and carbides of the Group IVB and Group VB transition metals and mixtures of these nitrides, borides and carbides. The Group IVB and VB metals include titanium, zirconium, hafnium, vanadium, niobium and tantalum.

The conductive polymer composite materials useful in the present invention can be made by techniques known to those skilled in the art. Such methods include, for example, the compression molding or ram extrusion of physical mixtures prepared by tumble blending powdered organic polymer and electrically conductive filler material (dry powder blends), melt blending, shear coagulation of dispersions or emulsions of the electrically conductive filler material and the organic polymer and gel coagulation of filler/polymer dispersion. The fabrication of the specific cell element, in this case, the current distributor, may be by known methods, for example, by molding, machining or extrusion.

The electrochemical cell of the first and second embodiments may further comprise cathode current distributing means disposed on one side of the reducing means, or electrode, or more specifically the cathode. The cathode current distributor collects current from the cathode and distributes it to the cathode bus by electronic conduction. Alternatively, the cathode current distributing means may be described as means disposed on one side of the reducing means, or cathode, for providing a barrier between the cathode current bus and the cathode, and between the cathode current bus and the hydrogen halide and the halogen gas. This barrier on the cathode side is desirable because there is some migration of hydrogen halide through the membrane. Preferably, the cathode current distributing means comprises a cathode current distributor 42 as shown in FIG. 1. The cathode current distributor may comprise the same organic polymer composite material as described above for the anode current distributor. However, it should be noted that the material used for the anode current distributor need not be the same as the material used for the cathode current distributor. In addition, it should be noted that the anode and cathode current distributors may be molded so that they act as flow fields as well as current distributors, thereby obviating the need for flow fields 28 and 30 as described above.

In the first and second embodiments, the electro-chemical cell also comprises a conductive structural support 44 disposed in contact with anode current distributor 40 and a support 41 disposed in contact with cathode current distributor 42. The support on both the anode and the cathode side is preferably made of UNS31603 (316L stainless steel). A seal 45, preferably in the form of an O-ring made from KALREZ®, is disposed between structural support 44 on the anode side and anode current distributor 40 and between structural support 41 on the cathode side and cathode current distributor 42. Thus, the anode side and the cathode side of the cell of the present invention are mirror images of each other. It should be noted that while structural supports 41 and 44 are shown inside of respective current buses 46 and 48 in FIG. 1, it is within the scope of the present invention for the structural supports to be placed outside the current buses (i.e., to the left of bus 46 and to the right of bus 48 as shown in FIG. 1) and still achieve the same results.

When more than one anode-cathode pair is used, such as in manufacturing, a bipolar arrangement, as familiar to one skilled in the art, is preferred. The electrochemical cell of the present invention may be used in a bipolar stack. To create such a bi-polar stack, current distributors 40 and 42 and all the elements disposed in between as shown in FIG. 1 are repeated along the length of the cell, and current buses are placed on the outside of the stack.

Further in accordance with the first and second embodiments of the present invention, there is provided a process for the direct production of essentially dry halogen gas from essentially anhydrous hydrogen halide. The anhydrous hydrogen halide may comprise hydrogen chloride, hydrogen bromide, hydrogen fluoride or hydrogen iodide. However, as noted above, hydrogen fluoride may be particularly corrosive when used with the present invention. The production of bromine gas and iodine gas can be accomplished when the electro-chemical cell is run at elevated temperatures (i.e., about 60° C. and above for bromine and about 190° C. and above for iodine). In the case of iodine, a membrane other than NAFION® should be used.

The operation of the electrochemical cell for the first embodiment, where hydrogen, as well as chlorine gas, is produced by the cell, will now be described as it relates to a preferred embodiment of the process of the present invention, where the anhydrous hydrogen halide is hydrogen chloride. In operation, current distributor 40 collects current from anode current bus 46 and distributes it to anode 12 by electronic conduction. Molecules of essentially anhydrous hydrogen chloride gas are fed to anode-side inlet 14 and through flow channels 29 in the anode mass flow field 28 and are transported to the surface of anode 12. The molecules are oxidized at the anode under the potential created by the voltage source to produce essentially dry chlorine gas ($Cl_2$ (g)) at the anode, and protons (H+). This reaction is given by the equation:

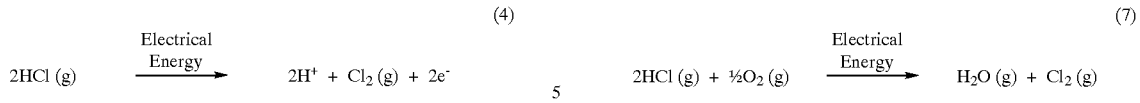

$$2HCl(g) \xrightarrow{\text{Electrical Energy}} 2H^+ + Cl_2(g) + 2e^- \quad (4)$$

The chlorine gas ($Cl_2(g)$) exits through anode-side outlet 16 as shown in FIG. 1. The protons (H+) are transported through the membrane, which acts as an electrolyte. The transported protons are reduced at the cathode. This reaction for the first embodiment is given by the equation:

$$2H^+ + 2e^- \xrightarrow{\text{Electrical Energy}} H_2(g) \quad (5)$$

Water is delivered to the cathode through cathode-side inlet 24 and through the grooves in cathode flow field 30 to hydrate the membrane and thereby increase the efficiency of proton transport through the membrane. In the first embodiment, the hydrogen which is evolved at the interface between the electrode and the membrane exits via cathode-side outlet 26 as shown in FIG. 1. The hydrogen bubbles through the water and is not affected by the PTFE in the electrode. Cathode current distributor 42 collects current from cathode 20 and distributes it to cathode current bus 48.

The operation of the electrochemical cell according to the second embodiment will now be described as it relates to a preferred embodiment of the process of the present invention, where the anhydrous hydrogen halide is hydrogen chloride. In operation, anode current distributor 40 collects current from anode current bus 46 and distributes it to anode 12. Molecules of essentially anhydrous hydrogen chloride are fed to anode-side inlet 14 and are transported through flow channels 29 of anode mass flow field 28 to the surface of anode 12. An oxygen-containing gas, such as oxygen ($O_2(g)$), air or oxygen-enriched air (i.e., greater than 21 mol % oxygen in nitrogen) is introduced through cathode-side inlet 24 and through the grooves formed in cathode mass flow field 30. Although air is cheaper to use, cell performance is enhanced when enriched air or oxygen is used. This cathode feed gas may be humidified to aid in the control of moisture in the membrane. Molecules of the hydrogen chloride (HCl(g)) are oxidized under the potential created by the voltage source to produce essentially dry chlorine gas at the anode, and protons (H+), as expressed in equation (4) above. The chlorine gas ($Cl_2$) exits through anode-side outlet 16 as shown in FIG. 1. The protons (H+) are transported through the membrane, which acts as an electrolyte. Oxygen and the transported protons are reduced at the cathode to water, which is expressed by the equation:

$$\tfrac{1}{2}O_2(g) + 2e^- + 2H^+ \rightarrow H_2O(g) \quad (6)$$

The water formed ($H_2O(g)$ in equation (6)) exits via cathode-side outlet 26 as shown in FIG. 1, along with any nitrogen and unreacted oxygen. The water also helps to maintain hydration of the membrane, as will be further explained below. Cathode current distributor 42 collects current from cathode 20 and distributes it to cathode bus 48.

In this second embodiment, the cathode reaction is the formation of water. This cathode reaction has the advantage of more favorable thermodynamics relative to $H_2$ production at the cathode as in the first embodiment. This is because the overall reaction in this embodiment, which is expressed by the following equation:

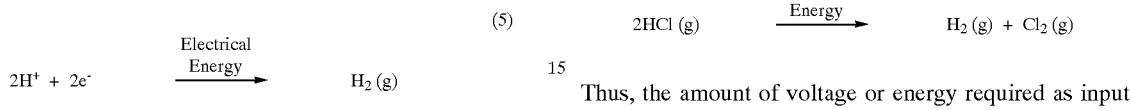

$$2HCl(g) + \tfrac{1}{2}O_2(g) \xrightarrow{\text{Electrical Energy}} H_2O(g) + Cl_2(g) \quad (7)$$

involves a smaller free-energy change than the free-energy change for the overall reaction in the first embodiment, which is expressed by the following equation:

$$2HCl(g) \xrightarrow{\text{Electrical Energy}} H_2(g) + Cl_2(g) \quad (8)$$

Thus, the amount of voltage or energy required as input to the cell is reduced in this second embodiment.

In the first and second embodiments, the cathode-side of the membrane must be kept hydrated in order to increase the efficiency of proton transport through the membrane. In the first embodiment, which has a hydrogen-producing cathode, the hydration of the membrane is obtained by keeping liquid water in contact with the cathode. The liquid water passes through the gas-diffusion electrode and contacts the membrane. In the second embodiment, which has a water-producing cathode, the membrane hydration is accomplished by the production of water as expressed by equation (6) above and by the water introduced in a humidified oxygen-feed or air-feed stream. This keeps the conductivity of the membrane high.

The electrochemical cell of the first and second embodiments can be operated over a wide range of temperatures. Room temperature operation is an advantage, due to the ease of use of the cell. However, operation at elevated temperatures provides the advantages of improved kinetics and increased electrolyte conductivity. Higher temperatures result in lower cell voltages. However, limits on temperature occur because of the properties of the materials used for elements of the cell. For example, the properties of a NAFION® membrane change when the cell is operated above 120° C. The properties of a polymer electrolyte membrane make it difficult to operate a cell at temperatures above 150° C. With a membrane made of other materials, such as a ceramic material like beta-alumina, it is possible to operate a cell at temperatures above 200° C.

Figure 2:
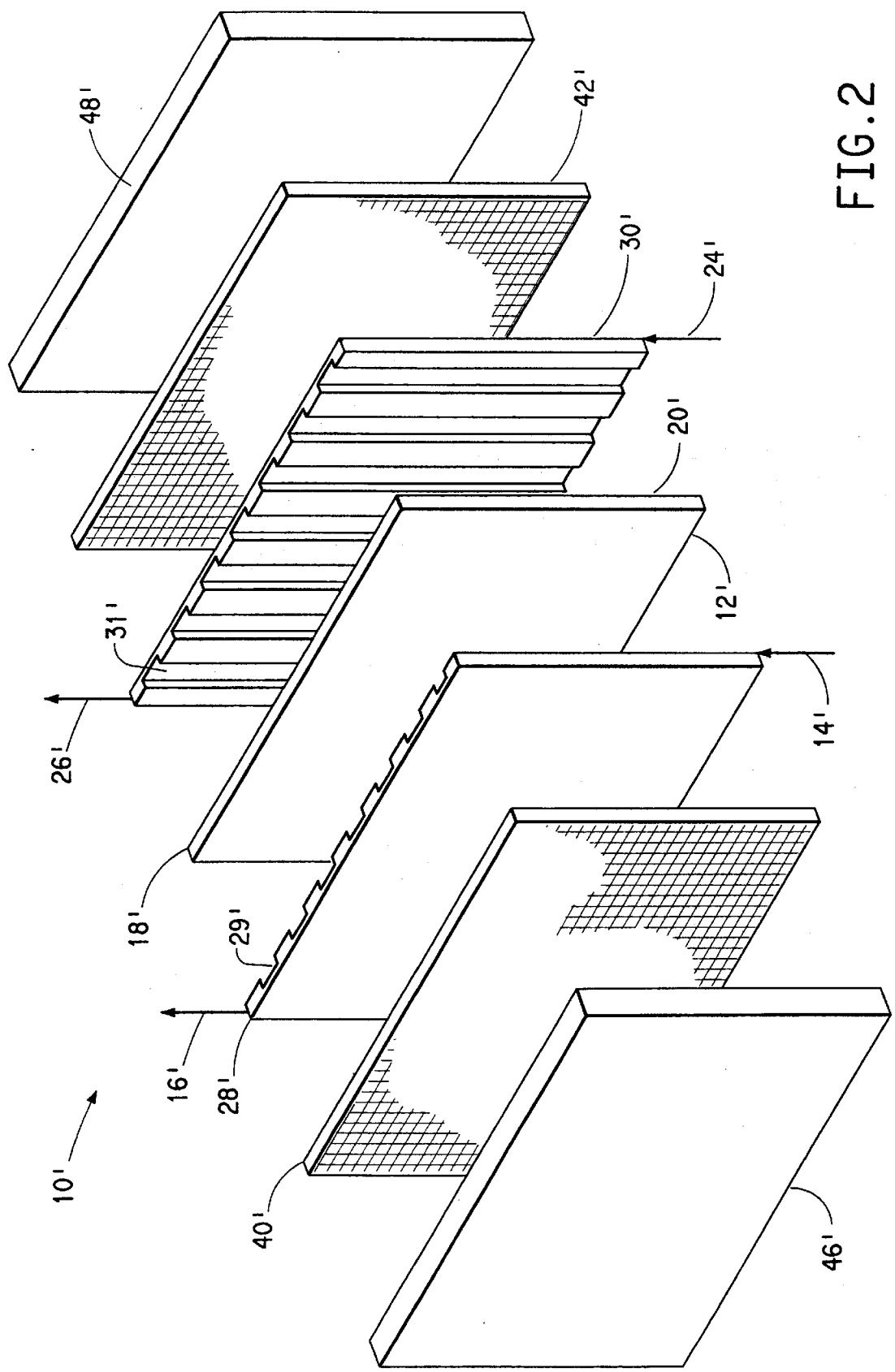
FIG. 2 is a perspective view of an electrochemical cell for producing, for example, halogen gas from aqueous hydrogen halide according to a third embodiment of the present invention.

FIG. 2 illustrates a third embodiment of the present invention. Wherever possible, elements corresponding to the elements of the embodiment of FIG. 1 will be shown with the same reference numeral as in FIG. 1, but will be designated with a prime ('). An electrochemical cell of the third embodiment is shown generally at 10' in FIG. 2. The electrochemical cell of the third embodiment will be described with respect to a preferred embodiment, where halogens, such as chlorine, are generated by the electrolysis of an aqueous solution of a hydrogen halide, such as hydrochloric acid. However, one could also use this cell for other uses, for instance, in a chlor-alkali system, with brine and hydrochloric acid. Alternatively, the cell of the third embodiment may be a fuel cell.

The electrochemical cell of the third embodiment comprises an electrode, or more specifically, an anode 12' and a cathode 20'. The electrochemical cell of the third embodiment also comprises a membrane disposed in contact with one side of the electrode. A membrane 18' is shown in FIG. 2 having one side disposed in contact with one side of anode 12'. Unlike the membrane in the first embodiment, the membrane need not necessarily be a cation-transporting membrane. Cathode 20' is disposed in contact with the other side (as opposed to the side which is in contact with the anode) of membrane as illustrated in FIG. 2.

The electrochemical cell of the third embodiment further comprises a mass flow field disposed in contact with the electrode. The mass flow field may be an anode mass flow field 28' disposed in contact with the anode, or a cathode mass flow field 30' disposed in contact with the cathode. The mass flow fields act as both mass and current flow fields. The purpose of the anode flow field is to get anolyte, such as aqueous HCl in the third embodiment to the anode and products, such as wet chlorine gas, from the anode. The purpose of the cathode flow field is to get catholyte to and product, such as hydrogen gas, from the cathode. More specifically, the mass flow fields include flow channels, or grooves, 29' and 31' as shown in FIG. 2.

The electrochemical cell of the third embodiment also comprises a current bus for conducting current to the electrode, where the current bus is disposed on the other side of the electrode. An anode current bus 46' and a cathode current bus 48' are shown in FIG. 2. The current buses conduct current from a voltage source (not shown). Specifically, anode current bus 46' is connected to the positive terminal of a voltage source, and cathode current bus 48' is connected to the negative terminal of the voltage source, so that when voltage is supplied to the cell, current flows from the voltage source through all of the elements to the right of current bus 46' as shown in FIG. 2, including current bus 48' from which it returns to the voltage source. As in the first two embodiments, the current buses of the third embodiment are made of a conductor material, such as copper.

The electrochemical cell of the third embodiment further comprises a current distributor disposed on one side of the electrode. An anode current distributor 40' is disposed on one side of anode 12', and a cathode current distributor 42' is disposed on one side of cathode 20'. As in the first two embodiments, the anode current distributor collects current from the anode bus and distributes it to the anode by electronic conduction. The cathode current distributor collects current from the cathode and distributes it to the cathode bus. The anode and the cathode current distributors preferably each comprise a non-porous layer. Moreover, as in the first two embodiments, the anode current distributor provides a barrier between the anode current bus and the anode, as well as between the anode current bus and the reactant, such as aqueous hydrogen chloride and the product, such as wet gaseous chlorine. The cathode current distributor provides a barrier between the cathode current bus and the cathode, as well as between the cathode current bus and the catholyte. The current distributors of the third embodiment are made of the same materials as described above for the first two embodiments. Thus, the cathode current distributor may comprise the same organic polymer composite material as described above specifically for the anode current distributor.

As known to one skilled in the art, if electrodes are placed on opposite faces of membrane, cationic charges (protons in the HCl reaction being described) are transported through the membrane from anode to cathode, while each electrode carries out a half-cell reaction. In the third embodiment, hydrochloric acid, which is introduced at arrow 14', which indicates the anode-side inlet, is electrolyzed at anode 12' to produce gaseous chlorine, which exits at arrow 16', which represent the anode-side outlet, and hydrogen ions ($H^+$). The $H^+$ ions are transported across membrane 18', to cathode 20' along with some water and some hydrochloric acid. The hydrogen ions are discharged at the cathode through a cathode-side outlet 26'. A cathode-side inlet, which is optional, depending on the use of the cell, is shown at 24' in FIG. 2.

Additional advantages and modifications will readily occur to those skilled in the art. The invention, in its broader aspects, is, therefore, not limited to the specific details, representative apparatus and illustrative Examples shown and described. Accordingly, departures may be made from such details without departing from the spirit or scope of the general inventive concept as defined by the appended claims and their equivalents.

What is claimed is:

1. An electrochemical cell, comprising:
    (a) a first electrode;
    (b) a membrane having one side thereof disposed in contact with one side of the first electrode;
    (c) a second electrode disposed in contact with the other side of the membrane; and
    (d) current distributing means disposed on the other side of the first electrode for distributing current by electronic conduction, wherein the current distributing means comprises a conductive polymer composite material having a bulk resistivity less than $1 \times 10^{-3}$ ohm·cm.

2. The electrochemical cell of any of claim 1, wherein the conductive polymer composite material is a composite comprising an organic polymer and an electrically conductive filler material.

3. The electrochemical cell of claim 2, wherein the organic polymer is selected from the group consisting of fluoropolymers, fluoroelastomers, elastomers and vinyl ester polymers.

4. The electrochemical cell of claim 3, wherein the organic polymer is an ethylene-tetrafluoroethylene copolymer.

5. The electrochemical cell of claim 4, wherein the electrically conductive filler material is selected from the group consisting of the carbides, borides and nitrides of the Group IVB and Group VB transition metals.

6. The electrochemical cell of claim 4, wherein the conductive filler material is titanium carbide.

7. The electrochemical cell of claim 3, wherein the organic polymer is a copolymer of tetrafluoroethylene and perfluoro(alkyl vinyl ether).

8. The electrochemical cell of claim 7, wherein the electrically conductive filler material is selected from the group consisting of the carbides, borides and nitrides of the Group IVB and Group VB transition metals.

9. The electrochemical cell of claim 8, wherein the electrically conductive filler material is titanium carbide.

10. An electrochemical cell for the direct production of essentially dry halogen gas from essentially anhydrous hydrogen halide, comprising:
    (a) means for oxidizing molecules of essentially anhydrous hydrogen halide to produce essentially dry halogen gas and protons;
    (b) cation-transporting means for transporting the protons therethrough, wherein one side of the oxidizing means is disposed in contact with one side of the cation-transporting means;
    (c) reducing means for reducing the transported protons, wherein the reducing means is disposed in contact with the other side of the cation-transporting means; and
    (d) current distributing means disposed on the other side of the oxidizing means for distributing current to the oxidizing means by electronic conduction and for allowing current to flow away from the oxidizing means, wherein the current distributing means comprises a conductive polymer composite material.

11. The electrochemical cell of claim 10, further comprising a cathode-side inlet for delivering a fluid to the cathode to hydrate the membrane.

12. The electrochemical cell of claim 11, wherein the oxidizing means is an anode, the cation-transporting means is a membrane, the reducing means is a cathode and the current distributing means is an anode current distributor, further comprising an anode mass flow field disposed in contact with the anode and a cathode mass flow field disposed in contact with the cathode, wherein the anode and the cathode mass flow fields each have flow channels formed therein and further wherein the flow channels of the anode mass flow field and of the cathode mass flow field are parallel to each other.

13. The electrochemical cell of claim 12, comprise porous graphite paper and the flow channels formed therein are vertical.

14. The electrochemical cell of claim 12, wherein the anode and the cathode each comprise an electrochemically active material.

15. The electrochemical cell of claim 14, wherein the electrochemically active material is bonded to a support structure.

16. The electrochemical cell of claim 15, wherein the support structure comprises carbon paper.

17. The electrochemical cell of claim 15, wherein the support structure comprises graphite cloth.

18. The electrochemical cell of claim 15, wherein the electrochemically active material comprises a catalyst material on a support material.

19. The electrochemical cell of claim 18, wherein the support material comprises particles of carbon and particles of polytetrafluoroethylene.

20. The electrochemical cell of claim 19, wherein the electrochemically active material is bonded by the particles of polytetrafluoroethylene to the support structure.

21. The electrochemical cell of claim 14, wherein the cation-transporting membrane is a proton-transporting membrane.

22. The electrochemical cell of claim 21, wherein the proton-transporting membrane comprises a hydrated copolymer of polytetrafluoroethylene and poly-sulfonyl fluoride vinyl-ether containing pendant sulfonic acid groups.

23. The electrochemical cell of claim 22, wherein the electrochemically active material comprises one of the following; platinum, ruthenium, osmium, rhenium, rhodium, iridium, palladium, gold, titanium and zirconium, and the oxides, alloys and mixtures thereof.

24. The electrochemical cell of 23, wherein the electrochemically active material of the anode comprises ruthenium oxide.

25. The electrochemical cell of claim 24, wherein the electrochemically active material of the cathode comprises platinum.

26. The electrochemical cell of claim 23, wherein the electrochemically active material of the anode and of the cathode comprises platinum.

27. The electrochemical cell of claims 25 or 26, wherein the loading of the electrochemically active material is about 0.35 mg/cm$^2$.

28. The electrochemical cell of claim 24, wherein the conductive polymer composite material has a bulk resistivity of less than $1 \times 10^{-3}$ ohm·cm.

29. The electrochemical cell of claim 28, wherein the conductive polymer composite material comprises a copolymer of tetrafluoroethylene and perfluoro(alkyl vinyl ether) and titanium carbide.

30. The electrochemical cell of claim 28, wherein the conductive polymer composite material comprises an ethylene-tetrafluoroethylene copolymer and titanium carbide.

31. The electrochemical cell of claim 23, wherein the anode and the cathode are gas diffusion electrodes.

32. The electrochemical cell of claim 31, wherein the catalyst loading of the electrochemically active material is in the range of 0.10 to 0.50 mg/cm$^2$.

33. The electrochemical cell of claim 23, wherein the electrochemically active material of each of the anode and the cathode is applied as a film from an ink onto the membrane, and the loading of the electrochemically active material is at least 0.017 mg/cm$^2$.

34. The electrochemical cell of claim 33, wherein the conductive polymer composite material has a bulk resistivity of less than $1 \times 10^{-3}$ ohm·cm.

35. The electrochemical cell of claim 34, wherein the conductive polymer composite material comprises a copolymer of tetrafluoroethylene and perfluoro(alkyl vinyl ether) and titanium carbide.

36. The electrochemical cell of claim 34, wherein the conductive polymer composite material comprises an ethylene-tetrafluoroethylene copolymer and titanium carbide.

37. An electrochemical cell for the direct production of essentially dry halogen gas from essentially anhydrous hydrogen halide, comprising:

(a) means for oxidizing molecules of essentially anhydrous hydrogen halide to produce essentially dry halogen gas and protons;

(b) cation-transporting means for transporting the protons therethrough, wherein one side of the oxidizing means is disposed in contact with one side of the cation-transporting means;

(c) reducing means for reducing the transported protons, wherein the reducing means is disposed in contact with the other side of the cation-transporting means;

(d) a current bus disposed on the other side of the oxidizing means; and (e) current distributing means disposed between the current bus and the oxidizing means for providing a barrier between the current bus and the essentially anhydrous hydrogen halide and the essentially dry halogen gas, wherein the current distributing means comprises a conductive polymer composite material.

38. The electrochemical cell of any of claims 10 or 37, wherein the conductive polymer composite material has a bulk resistivity less than $1 \times 10^{-3}$ ohm·cm.

39. The electrochemical cell of claim 38, wherein the conductive polymer composite material is a composite comprising an organic polymer and an electrically conductive filler material.

40. The electrochemical cell of claim 39, wherein the organic polymer is selected from the group consisting of fluoropolymers, fluoroelastomers, elastomers and vinyl ester polymers.

41. The electrochemical cell of claim 40, wherein the organic polymer is an ethylene-tetrafluoroethylene copolymer.

42. The electrochemical cell of claim 41, wherein the electrically conductive filler material is selected from the group consisting of the carbides, borides and nitrides of the Group IVB and Group VB transition metals.

43. The electrochemical cell of claim 42, wherein the conductive filler material is titanium carbide.

44. The electrochemical cell of claim 43, wherein the cation-transporting means is a membrane and the reducing means is a cathode and further wherein one side of the cathode is disposed in contact with the other side of the membrane, further comprising a cathode current distributor disposed on the other side of the cathode, wherein the cathode current distributor comprises an ethylene-tetrafluoroethylene copolymer and titanium carbide.

45. The electrochemical cell of claim 44, wherein the membrane comprises a hydrated copolymer of polytetrafluoroethylene and poly-sulfonyl fluoride vinyl ether-containing pendant sulfonic acid groups, and the oxidizing means is an anode comprising ruthenium oxide.

46. The electrochemical cell of claim 40, wherein the organic polymer is a copolymer of tetrafluoroethylene and perfluoro(alkyl vinyl ether).

47. The electrochemical cell of claim 46, wherein the electrically conductive filler material is selected from the group consisting of the carbides, borides and nitrides of the Group IVB and Group VB transition metals.

48. The electrochemical cell of claim 47, wherein the electrically conductive filler material is titanium carbide.

49. The electrochemical cell of claim 48, wherein the cation-transporting means is a membrane and the reducing means is a cathode and further wherein one side of the cathode is disposed in contact with the other side of the membrane, further comprising a cathode current distributor disposed on the other side of the cathode, wherein the cathode current distributor comprises a copolymer of tetrafluoroethylene and perfluoro(alkyl vinyl ether).

50. The electrochemical cell of claim 49, wherein the membrane comprises a hydrated copolymer of tetrafluoroethylene and poly-sulfonyl fluoride vinyl ether-containing pendant sulfonic acid groups and the oxidizing means is an anode comprising ruthenium oxide.

* * * * *

UNITED STATES PATENT AND TRADEMARK OFFICE
CERTIFICATE OF CORRECTION

PATENT NO. : 6,042,702
DATED : March 28, 2000
INVENTOR(S) : Kolouch et al.

It is certified that error appears in the above-identified patent and that said Letters Patent is hereby corrected as shown below:

Title page,
Inventors, "; Douglas John Eames, Chamblee, Ga." should not appear.

Signed and Sealed this

Twenty-fifth Day of December, 2001

*Attest:*

JAMES E. ROGAN
*Attesting Officer*    *Director of the United States Patent and Trademark Office*